United States Patent
Gonzalez (10) Patent No.: US 8,757,053 B2
(45) Date of Patent: Jun. 24, 2014

(54) TORTILLA CARTRIDGE FOR STORING TORTILLAS AND FOR LOADING TORTILLAS INTO A TORTLILA WARMER

(75) Inventor: Ricardo Gonzalez, Citrus Heights, CA (US)

(73) Assignee: Ricomale, LLC, Modesto, CA (US)

( * ) Notice: Subject to any disclaimer, the term of this patent is extended or adjusted under 35 U.S.C. 154(b) by 348 days.

(21) Appl. No.: 13/019,791

(22) Filed: Feb. 2, 2011

(65) Prior Publication Data

US 2012/0193257 A1    Aug. 2, 2012

(51) Int. Cl.
  *A21B 1/48* (2006.01)
  *G07F 9/10* (2006.01)
  *A24F 15/04* (2006.01)

(52) U.S. Cl.
  USPC ............... 99/443 C; 221/150 A; 221/190

(58) Field of Classification Search
  USPC ......... 221/209, 185, 190, 186, 254, 279, 150, 221/164, 96; 219/64, 388; 99/646, 443, 99/421, 386, 377, 360; 220/62.13, 495.03
  See application file for complete search history.

(56) References Cited

U.S. PATENT DOCUMENTS

| | | | |
|---|---|---|---|
| 2,182,682 A | 12/1939 | Shroyer | |
| 2,864,932 A | 12/1958 | Forrer | |
| 3,740,513 A | 6/1973 | Peters, Jr. et al. | |
| 4,013,869 A | 3/1977 | Orts | |
| 4,147,924 A | 4/1979 | DeWitt, Jr. | |
| 4,769,252 A | 9/1988 | Escamilla | |
| 4,782,745 A | 11/1988 | George, Jr. | |
| 4,987,827 A | 1/1991 | Marquez | |
| 5,036,179 A | 7/1991 | Westerberg et al. | |
| 5,121,677 A * | 6/1992 | Le Claire et al. | ............... 99/357 |
| 5,123,178 A | 6/1992 | Stein | |
| 5,191,996 A * | 3/1993 | Jenkins | ........................... 221/64 |
| 5,337,915 A * | 8/1994 | Hall, Jr. | ................... 220/495.11 |

(Continued)

FOREIGN PATENT DOCUMENTS

| | | | |
|---|---|---|---|
| DE | 202004001460 U1 | 5/2004 | |
| EP | 1252848 A3 | 1/2004 | |

(Continued)

OTHER PUBLICATIONS

Google Search #1 downloaded on Jul. 16, 2009 http://www.zesco.com/products.cfm?subCatID=2519&PGroupID=040708AZ01.

(Continued)

*Primary Examiner* — Henry Yuen
*Assistant Examiner* — Michael Laflame, Jr.
(74) *Attorney, Agent, or Firm* — Russ Weinzimmer & Associates P.C.

(57) ABSTRACT

A tortilla cartridge with fresh sealing capabilities and a tortilla conveying capabilities is disclosed. The tortilla cartridge allows for efficient conveying of tortillas through a tortilla warmer, and also provides for easy storage of the tortillas in a manner that keeps them fresh. The cartridge provides a stack of tortillas, ensuring that the top side a top tortilla is exposed at a top opening of the container at the appropriate time for the top tortilla to be removed from the cartridge, through the tortilla warmer. At a predetermined time interval from a previous top tortilla being removed from the container, the new top tortilla will be positioned at the top of the stack of tortillas in the cartridge, to be removed in the same manner. This configuration allows for automatic conveying of tortillas, in sequence, through the tortilla warmer.

6 Claims, 15 Drawing Sheets

(56) References Cited

U.S. PATENT DOCUMENTS

| | | | |
|---|---|---|---|
| 5,535,664 | A | 7/1996 | Rokowski |
| 5,584,231 | A | 12/1996 | DeLeon |
| 5,676,051 | A | 10/1997 | Sinemus |
| 5,765,471 | A | 6/1998 | Monard |
| 5,948,301 | A | 9/1999 | Liebermann |
| 6,119,884 | A * | 9/2000 | Lowry .................. 220/62.13 |
| D436,797 | S | 1/2001 | Huang et al. |
| D442,423 | S | 5/2001 | Monard |
| 6,268,592 | B1 | 7/2001 | Hu et al. |
| 6,373,030 | B1 | 4/2002 | Waldrep |
| 6,838,644 | B1 | 1/2005 | Chung-Ting |
| 7,012,218 | B2 | 3/2006 | Flinn |
| 7,094,991 | B2 | 8/2006 | Naranjo et al. |
| 7,096,893 | B2 * | 8/2006 | Vilalta et al. .................. 141/65 |
| 7,235,762 | B2 | 6/2007 | Gagas et al. |
| 7,495,196 | B2 | 2/2009 | Groll |
| 7,523,841 | B2 * | 4/2009 | Konig .................. 221/232 |
| 2002/0152898 | A1 | 10/2002 | DuBois et al. |
| 2003/0052117 | A1 | 3/2003 | Iniestra Hernandez |
| 2005/0006375 | A1 | 1/2005 | Naranjo et al. |
| 2006/0185527 | A1 | 8/2006 | Shei |
| 2006/0263181 | A1 * | 11/2006 | Malenke et al. .................. 414/418 |
| 2006/0289426 | A1 | 12/2006 | Naranjo et al. |
| 2007/0034096 | A1 | 2/2007 | Axinte et al. |
| 2007/0228035 | A1 * | 10/2007 | Islas .................. 219/725 |
| 2007/0272676 | A1 | 11/2007 | Zougou et al. |
| 2008/0149661 | A1 * | 6/2008 | Sines .................. 221/279 |
| 2008/0282903 | A1 | 11/2008 | Gonzalez |
| 2009/0078607 | A1 * | 3/2009 | Ballard .................. 206/541 |

FOREIGN PATENT DOCUMENTS

| | | |
|---|---|---|
| EP | 1739358 A1 | 1/2007 |
| WO | 0065970 | 11/2000 |
| WO | 2005034697 A1 | 4/2005 |
| WO | 2006040540 A1 | 4/2006 |

OTHER PUBLICATIONS

Google Search #2 downloaded on Jul. 16, 2009 http://www.zesco.com/products.cfm?subCatID=2519&PGroupID=ZP99092003.

Google Search #3 downloaded on Jul. 16, 2009 http://www.zesco.com/products.cfm?subCatID=1818&PGroupID=050831SS03.

Google Search #4 downloaded on Jul. 16, 2009 http://www.bigtray.com/vollrath-heat-n-serve-food-warmer-72050-sku-vol72050-c-13130.html.

Google Search #5 downloaded on Jul. 16, 2009 http://www.restaurantequipment.com/STAR1HOTDOG.htm.

Google Search #6 downloaded on Jul. 16, 2009 http://cgi.ebay.com.my/Elite-Cuisine-Pizzelle-Maker-Flatbread-Tortilla-Warmer__W0QQcmdZViewItemQQitemZ120388470195.

Google Search #7 downloaded on Jul. 16, 2009 http://www.cooking.com/products/shprodde.asp?SKU=193716.

Google Search #8 downloaded on Jul. 16, 2009 http://www.cooking.com/products/shprodde.asp?SKU=392776.

Google Search #9 downloaded on Jul. 16, 2009 http://www.kitchengadgetry.com/kitchen/gadgets/star-tortilla-grill-tg1-p-6664.html.

* cited by examiner

TORTILLA CARTRIDGE FOR STORING TORTILLAS AND FOR LOADING TORTILLAS INTO A TORTLILA WARMER

FIELD

This invention relates to food preparation devices, and more specifically to tortilla warmers.

BACKGROUND

Tortillas are a popular food item, usually enjoyed best when they have just been cooked. Uncooked tortillas typically do not provide the same taste appeal as warmed tortillas. Often, tortillas are eaten in combination with other hand-held food. Preparing such meals would require an added step beforehand, in order to warm the tortilla so as to optimize the tortilla's flavor and texture.

Warming devices, including devices designed specifically for warming tortillas, are known in the art. Tortilla warmers are popular for their ability to warm tortillas to an appropriate temperature so as to be properly enjoyed with a meal. However, current tortilla warmer equipment has significant drawbacks.

Many tortilla warmers attempt to warm multiple tortillas as a batch, rather than one at a time in series. This does not ensure that all tortillas will be heated to the same degree, and can cause sticking among tortillas. Other warmers that allow for heating of multiple tortillas require input of each tortilla into a separate compartment, which takes away from the convenience of a tortilla warmer.

Still other warmers which warm tortillas in series nonetheless require insertion of one tortilla at a time, also detracting from the convenience to the user.

SUMMARY

A tortilla cartridge with fresh sealing capabilities and tortilla conveying capabilities is disclose and claimed. The tortilla cartridge allows for efficient conveying of tortillas through a tortilla warmer, and also provides for easy storage of the tortillas in a manner that keeps them fresh. The cartridge provides a stack of tortillas, ensuring that the top side a top tortilla is exposed at a top opening of the container at an appropriate time for the top tortilla to be removed from the cartridge, through the tortilla warmer. At a predetermined time interval from a previous top tortilla being removed from the container, the new top tortilla will be positioned at the top of the stack of tortillas in the cartridge, to be removed in the same manner. This configuration allows for automatic conveying of tortillas, in sequence, through the tortilla warmer.

A general aspect of the invention is a tortilla cartridge for storing and loading tortillas into a tortilla warmer. The tortilla cartridge includes: a container capable of holding a stack of tortillas, the stack having a top tortilla in a top position, the container also being capable of raising the stack of tortillas after the top tortilla is removed from the top position, so as to raise a newly revealed tortilla into the top position; a lid for covering the top of the container; and a fresh sealing mechanism for sealing the lid closed against the container with an airtight seal, so as to keep the stack of tortillas fresh.

In some embodiments, the container includes a self-leveling mechanism. In some of these embodiments, the self-leveling mechanism is mechanical or electro-mechanical. In some of these embodiments, the self-leveling mechanism includes a motor-driven elevator assembly.

In some embodiments, the tortilla cartridge further includes at least one gear in communication with a toothed column and a worm drive.

In some embodiments, the self-leveling mechanism can receive commands from a control unit.

In some embodiments, the self-leveling mechanism can receive commands via hard wiring and/or wireless signal.

In some embodiments, the self-leveling mechanism is sensor-based.

In some embodiments, the self-leveling mechanism further includes servomechanisms to adjust the height of the stack of tortillas.

In some embodiments, the fresh sealing mechanism includes a sealant and locking clips. In some embodiments, the fresh sealing mechanism includes a twisting seal. In some embodiments, the fresh sealing mechanism provides an airtight seal.

In some embodiments, the fresh sealing mechanism further includes a pump capable of removing some air from inside the cartridge.

In some embodiments, the tortilla cartridge is made from plastic. In some embodiments, the lid of the tortilla cartridge is adapted to also serve as a tortilla receiver, the tortilla receiver being capable of receiving tortillas that have been warmed by the tortilla warmer and subsequently ejected therefrom.

In some embodiments, the container is insulated. In some embodiments, the container is at least heat-resistant. In some embodiments, the tortilla cartridge is refrigeratable and/or freezable.

In some embodiments, the cartridge further includes a handle.

In some embodiments, the container is shaped so as to fit into a housing of a tortilla warmer.

BRIEF DESCRIPTION OF THE DRAWINGS

The invention will be more fully understood by reference to the detailed description, in conjunction with the following figures, wherein.

DETAILED DESCRIPTION OF THE INVENTION

A tortilla cartridge is disclosed, the cartridge being able to keep a stack of tortillas freshly sealed when not in use, and to raise the stack tortillas when in use, so as to feed the tortillas in series into a heating sub-system of a tortilla warmer. The cartridge includes a container capable of holding a stack of tortillas, and is capable of raising the stack of tortillas after the top tortilla is removed from the top position, so as to raise a newly revealed tortilla into the top position. The cartridge also includes a lid for covering the top of the container, and a fresh sealing mechanism for sealing the lid closed against the container with at least an airtight seal, so as to keep the stack of tortillas fresh.

Figure 1:
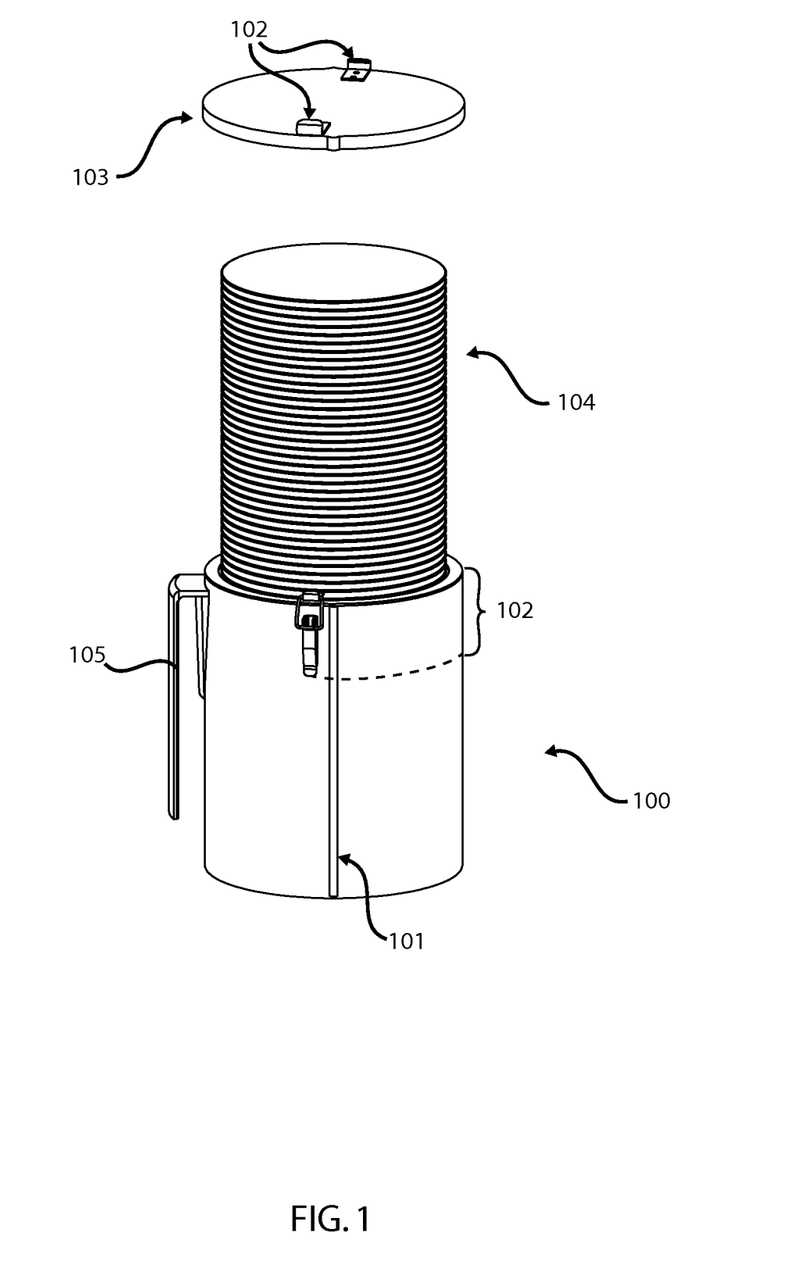
FIG. 1 is an expanded view of an embodiment of the tortilla cartridge being filled with a stack of tortillas.
Figure 2:
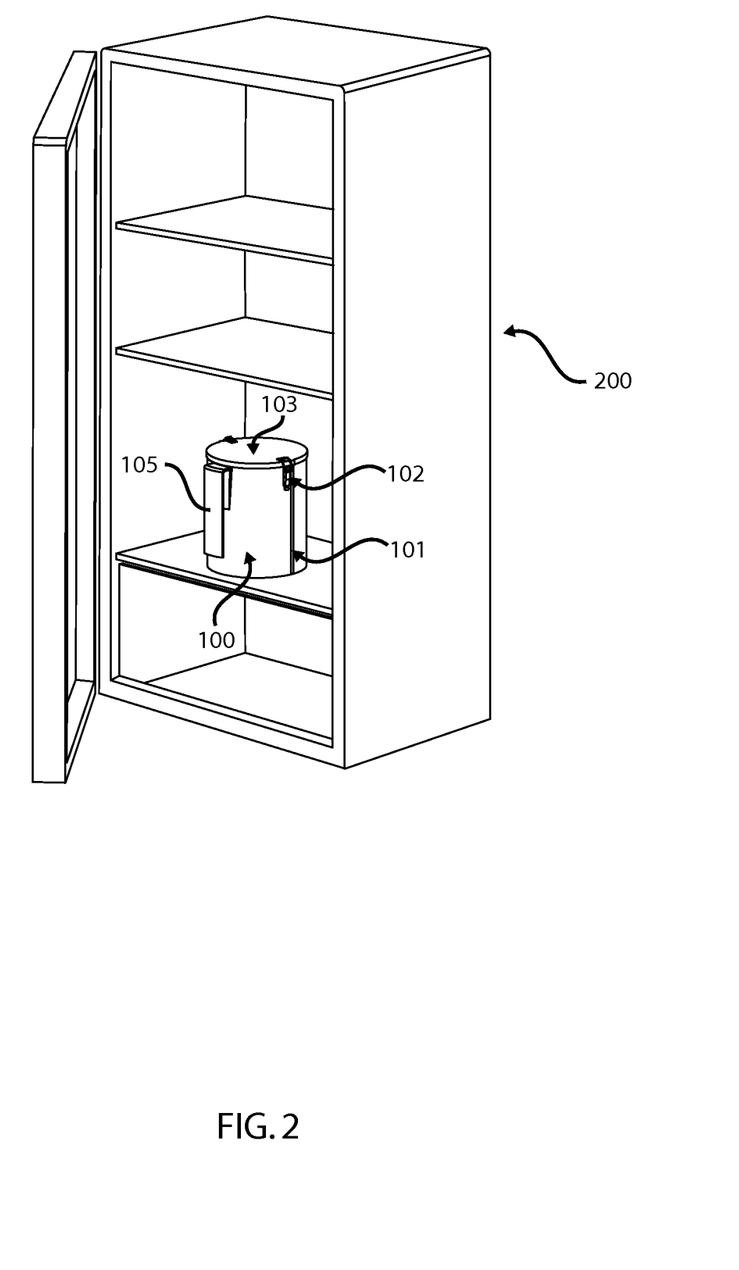
FIG. 2 is an illustration of the embodiment of FIG. 1 housed within a refrigerator.

FIG. 1 is an expanded view of a tortilla cartridge being filled with a stack of tortillas. The cartridge 100 includes a fresh sealing mechanism 102 to keep the tortillas fresh when not being eaten or heated. In the embodiment shown, the fresh sealing mechanism is a set of locking clips and a sealant layer 102. The cartridge includes a lid 103, and a handle 105 for inserting the cartridge into a tortilla warmer. The cartridge 100 is shown being filled with a stack of tortillas 104. The cartridge 100 can be stored in a temperature-controlled environment as well, such as a refrigerator 200 for example, as shown in FIG. 2.

Figure 3:
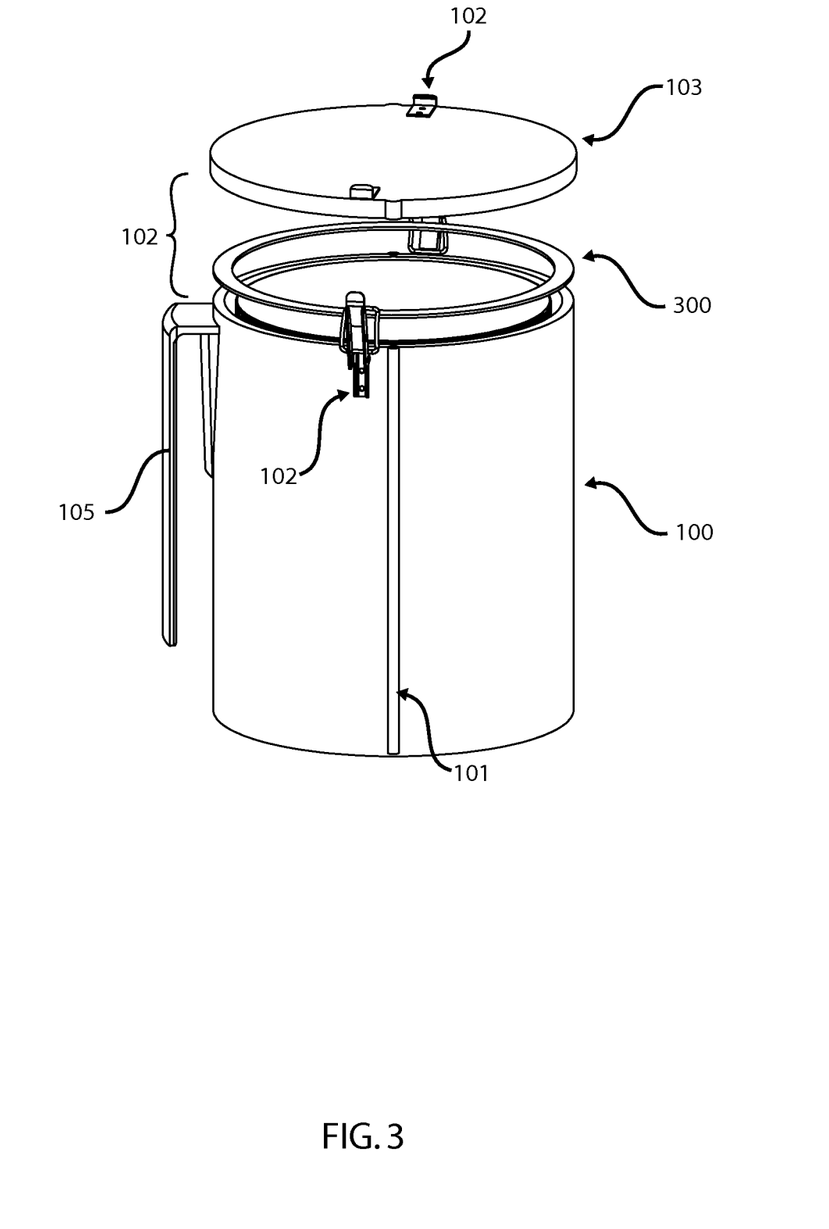
FIG. 3 is an oblique exploded view of an embodiment of the fresh sealing components of the embodiment of FIG. 1.
Figure 4:
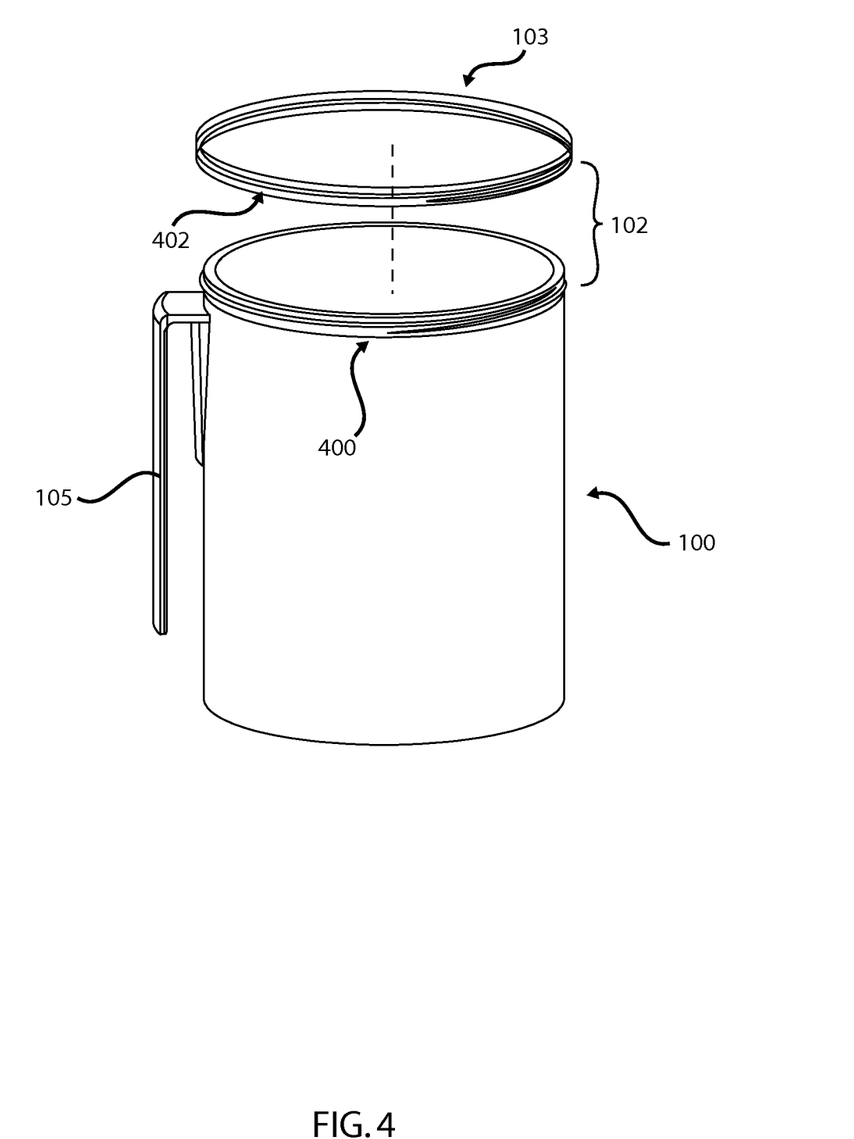
FIG. 4 is an oblique view of an alternative embodiment of the tortilla cartridge.

FIG. 3 is an oblique exploded view of the embodiment of FIG. 1. A sealant layer 300 and locking clips 102 are shown in this embodiment. The fresh sealing components 102 can provide an airtight seal. In some embodiments, the fresh seal 102 can prevent any moisture and/or condensation from entering the cartridge 100, so as to keep the tortillas therein dry. The fresh seal of the cartridge 100 can be any fresh seal known to one of ordinary skill in the art. For example, the fresh seal can be a twisting seal 400, 402, as shown in FIG. 4. In FIG. 4, the lid is shown in a transparent view, revealing threads 402 around the inner circumference of the lid 103 which can twist together with the container threads 400 to create an airtight seal.

Figure 5:
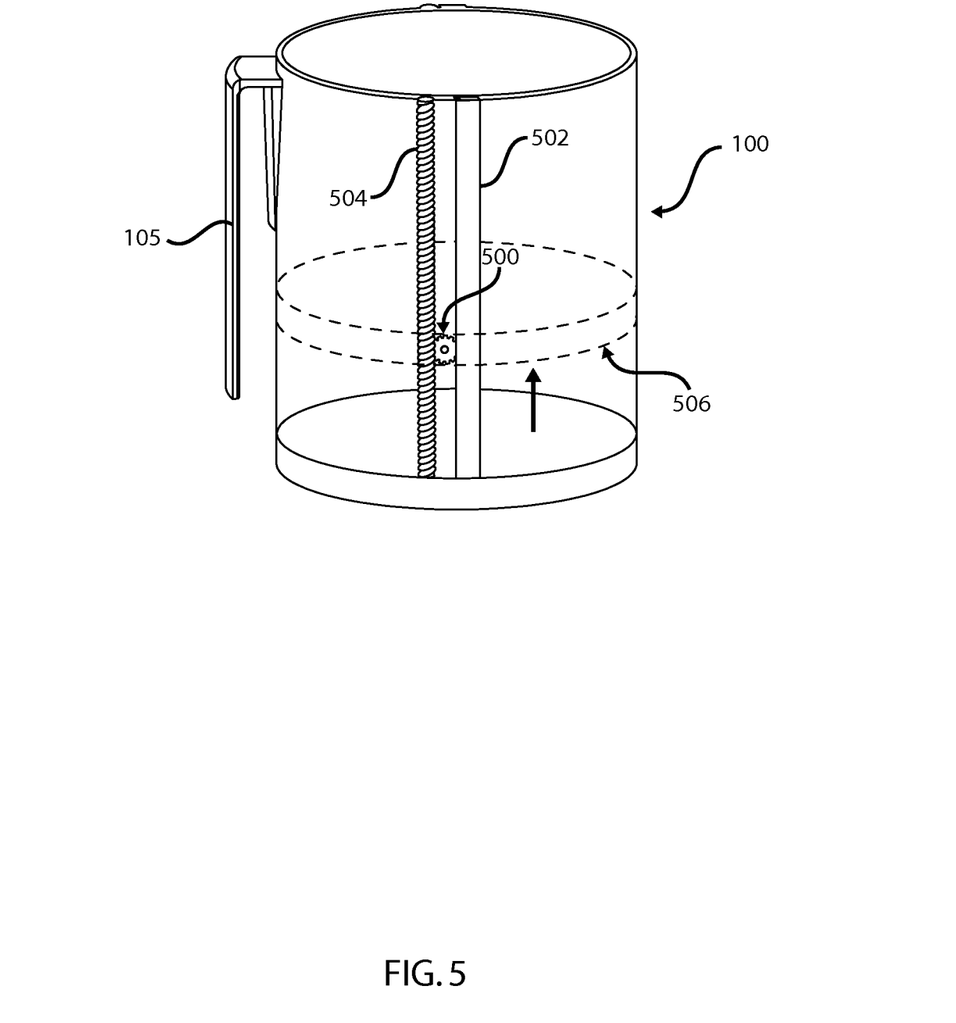
FIG. 5 is an oblique view of an embodiment of the tortilla cartridge that includes a self-leveling mechanism employing an electro-mechanical system.

The cartridge 100 is adapted so as to be capable of raising a stack of tortillas, thereby facilitating the conveying of the tortillas in sequence into a heating sub-system of a tortilla warmer. The cartridge 100 can include a self-leveling mechanism in some embodiments. FIG. 5 is an oblique view of an embodiment of a tortilla cartridge 100 that includes an automated leveling mechanism, assembled from the components of a gear 500, a toothed rack 502, and a worm drive 504.

The automated leveling mechanism shown in FIG. 5 functions as a tortilla elevator. Other embodiments will be apparent to one of ordinary skill in the art, such as a spring-based self-leveling mechanism, various types of which are already known in the art. In this embodiment, a motor-driven gear 500 is shown in communication with a toothed column 502 and a worm drive 504. The worm drive 504 can be driven by a motor in a different location, such as underneath the cartridge 100, for example.

Figure 6:
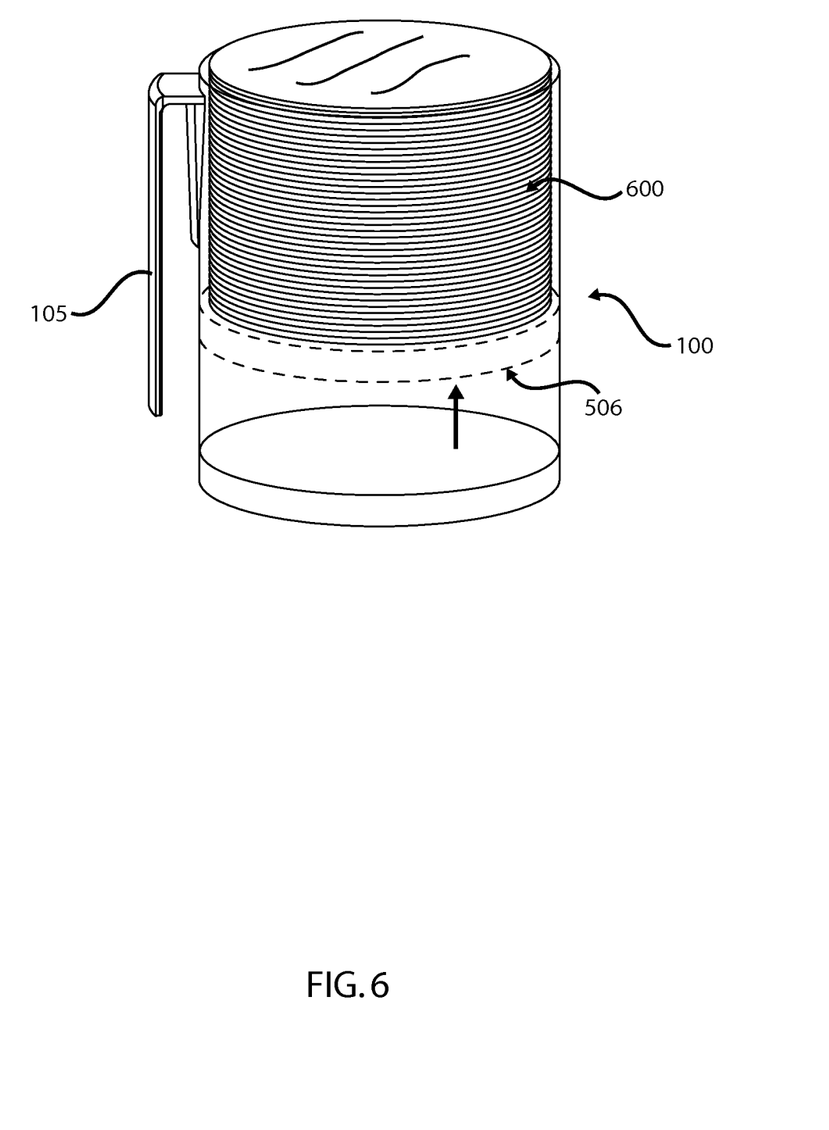
FIG. 6 is an oblique isolated view of the embodiment of FIG. 5 in use.

FIG. 6 is an oblique isolated view of the embodiment of FIG. 5 in use. The stack of tortillas 600 is raised via the tortilla elevator assembly. In some embodiments, the motor driving the gear (see FIG. 5) can be controlled by a control system, so as to calibrate the proper speed at which to raise the stack of tortillas 600 so that the tortillas 600 can be conveyed through the heating sub-system in sequence.

Such a control system can be an automated control system, or a manually adjustable control system. The motor speed can be calibrated by means of a manual switch, for example, or by a remote control, or a control panel physically on the housing of the warming system. The speed at which the stack of tortillas 600 is raised can be relevant to how quickly a user finishes one tortilla and desires another. More precise regulation of the rate of elevation can also be important to accommodate a difference in thickness of tortillas of a given stack of tortillas 600.

Figure 7:
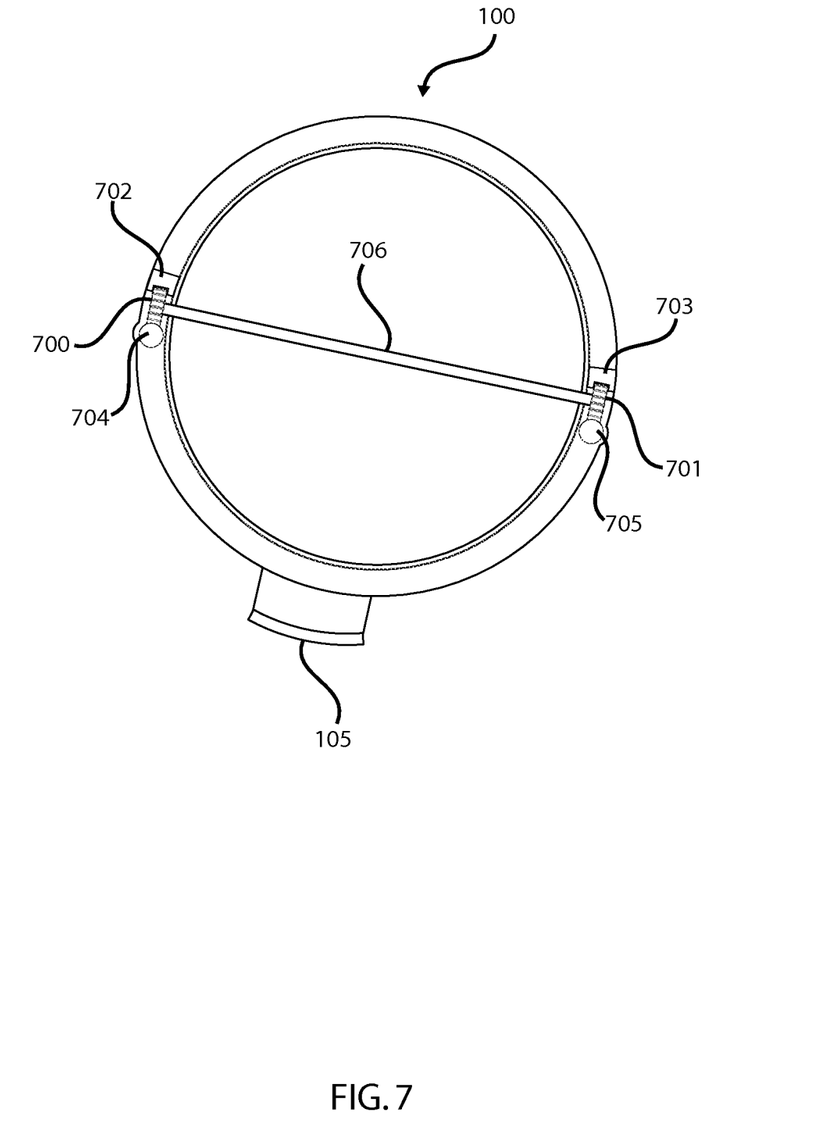
FIG. 7 is a top view of an embodiment of a motor-driven tortilla elevator assembly containing a pair of motor-driven gears connected by an axle.

FIG. 7 is a top view of an embodiment of a motor-driven tortilla elevator drive assembly containing a pair of motor-driven gears. This embodiment is one potential embodiment for a tortilla elevator drive mechanism. Other embodiments of motor-driven tortilla elevators will be apparent to one skilled in the art. In this embodiment, two gears 700, 701 are connected to each other by a single axle 706. Each of the gears 700, 701 travel vertically within a toothed column 702, 703 containing a toothed channel. The gears 700, 701 are worm gears that are each enmeshed with a corresponding worm drive 704, 705 that drives the respective gear 700, 701. In the embodiment shown, each of the gears 700, 701 is indirectly driven by a motor (not shown), which drives each of the worm drives 704, 705. The worm drives 704, 705 drive the gears, which crawl upwards through the channels of the toothed columns 702, 703 as the worm drives 704, 705 drive the gears 700, 701.

Figure 8:
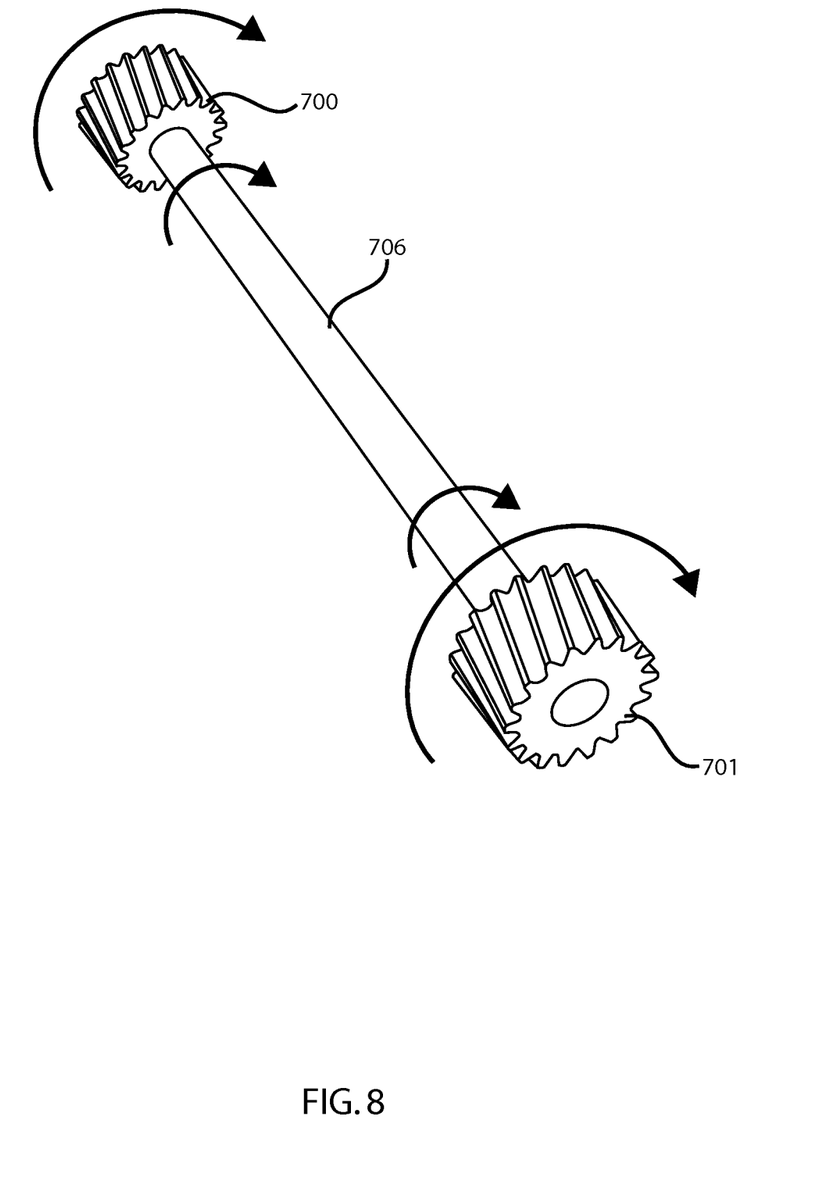
FIG. 8 is an isolated oblique view of the pair of motor-driven gears shown in FIG. 5.
Figure 9A:
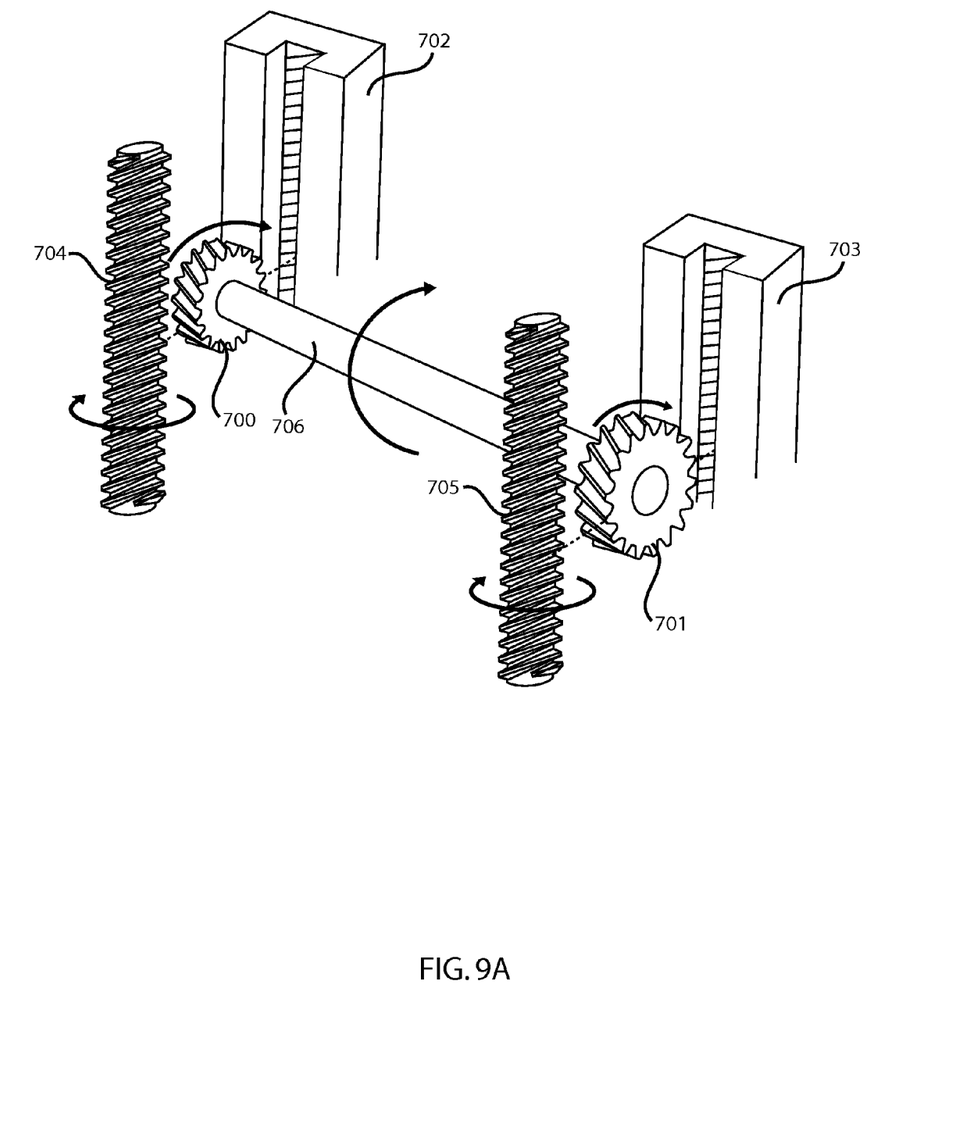
FIG. 9A is an oblique illustration of the interaction between the pair of motor-driven gears of FIG. 5, and a pair of toothed columns and a pair of worm drives.
Figure 9B:
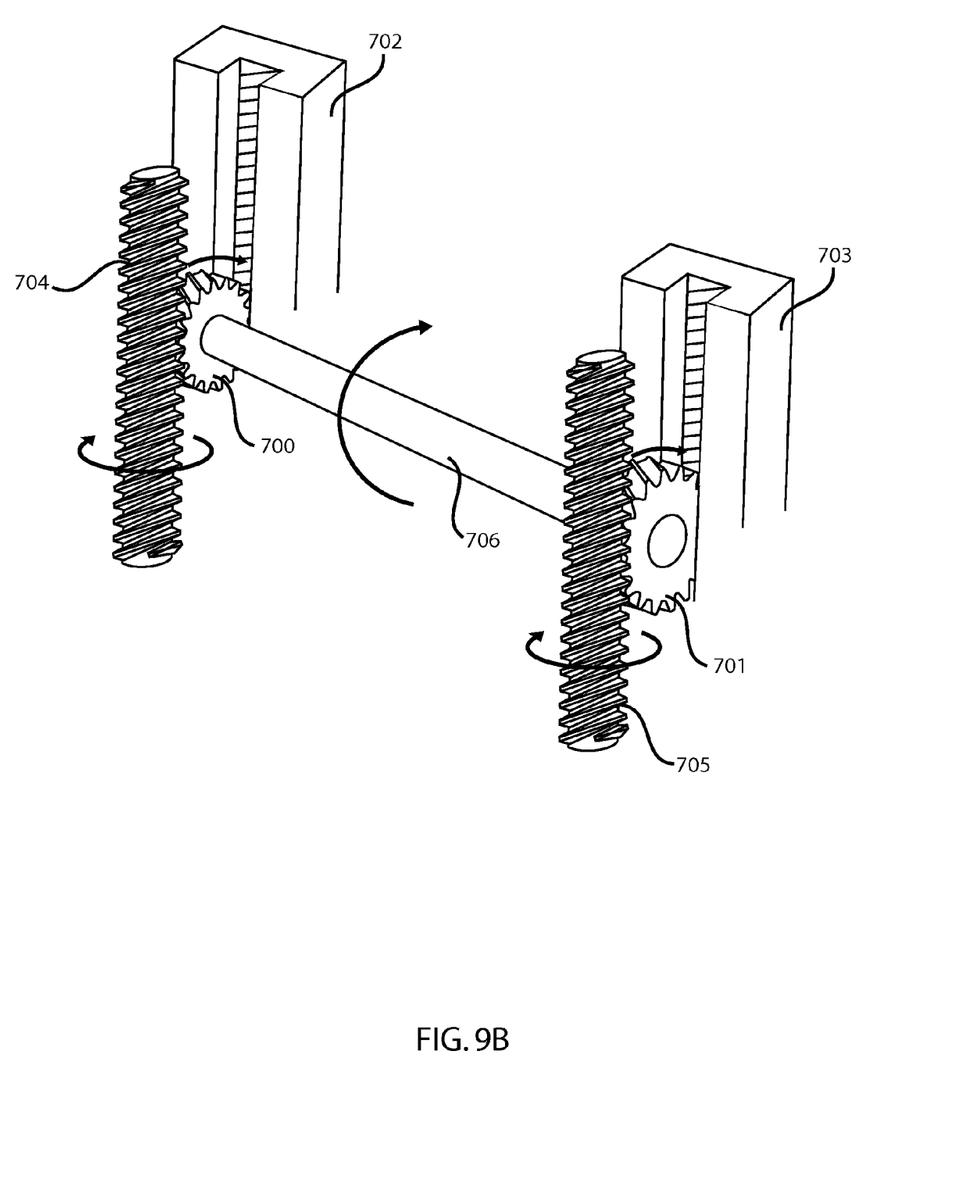
FIG. 9B is an oblique illustration of the motor-driven gears of FIG. 5 intermeshed with the toothed columns and worm drives.

FIG. 8 is an isolated oblique view of the pair of motor-driven gears 700, 701 shown in FIG. 7. FIG. 9A is an oblique illustration of the relative orientation between the pair of motor-driven gears 700, 701, and a pair of toothed columns 702, 703 and a pair of worm drives 704, 705. FIG. 9B is an oblique illustration of the motor-driven gears 700, 701 intermeshed with the toothed columns 702, 703 and worm drives 704, 705.

Figure 10:
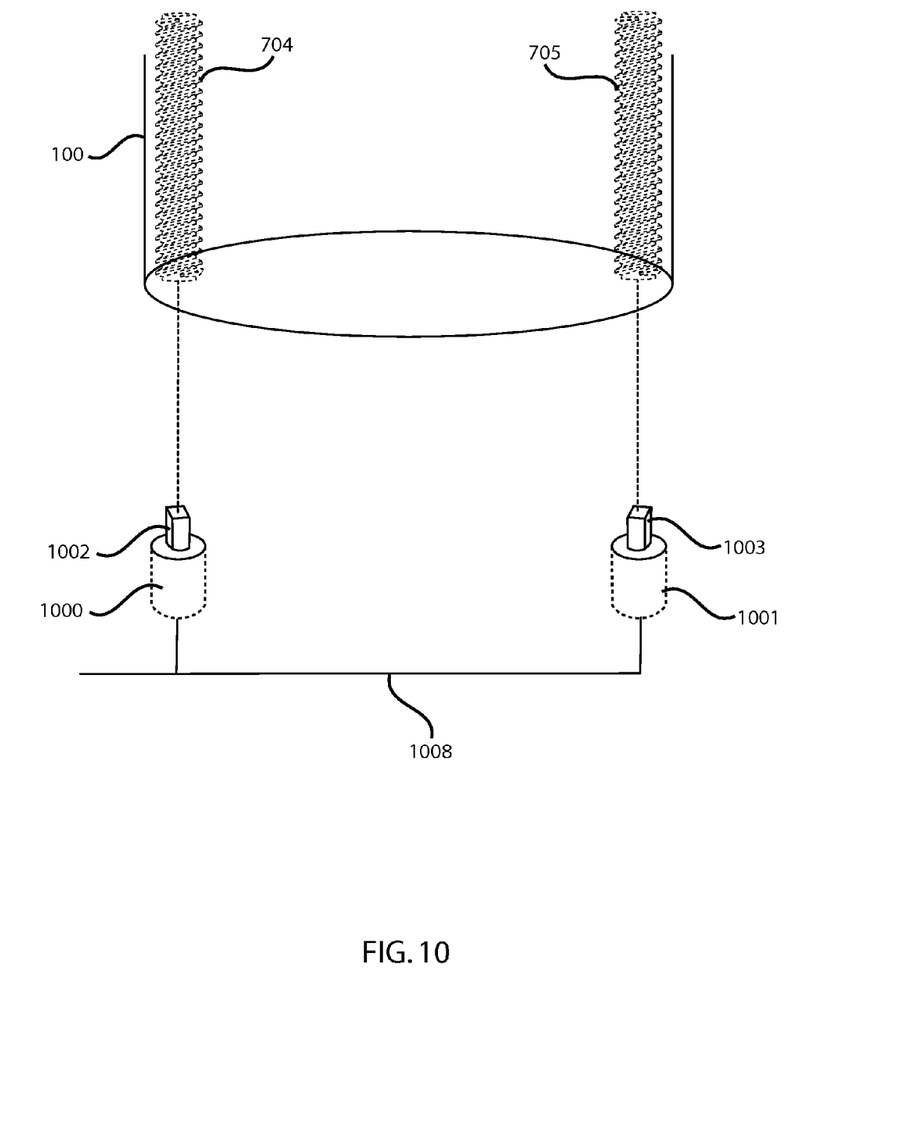
FIG. 10 is a profile view showing how the bottom of the tortilla cartridge can be inserted into a motor assembly in one embodiment.

FIG. 10 is a profile view showing how the bottom of the cartridge 100 can be inserted into a motor-driven assembly in a possible embodiment. In this embodiment, a pair of motors 1000, 1001 drive two separate rectangular rods 1002, 1003 which can in turn be inserted into rectangular female portions of the worm drives 704, 705. In this manner, the motors 1000, 1001 are able to drive the worm drives 704, 705, once the cartridge 100 is correctly inserted into the tortilla warmer housing. The motors 1000, 1001 can be wired together via an electrical power wire 1008 so that the motors 1000, 1001 are synchronized with each other. Furthermore, the motors 1000, 1001 can be controlled by a gear box which synchronizes the motors 1000, 1001 to other components of the tortilla feeding system as well.

In the embodiment shown, or any embodiment including a motor-driven elevator assembly, the assembly can also include at least one sensor, as well as possibly a servomechanism. The servomechanism can adjust the rate and direction of the elevator movement based on sensor information indicating the height of the top of the stack of tortillas, for example. In one potential example of how such an arrangement can work, a sensor can be placed at the top of the cartridge 100 to determine the height of the top tortilla, and adjust the height of the elevator floor accordingly, so as to bring the top tortilla up to the requisite height so as to enable the top tortilla to be conveyed into a heating sub-system of the tortilla warmer.

In some embodiments, a control system can control the velocity of movement of the tortilla elevator, to accommodate the desired speed of conveying the tortillas through the warming system, for example. Furthermore, if there are a variety of thicknesses of tortillas, the control system can be programmed so as to accommodate the difference in thickness of tortillas, and raise the elevator more slowly for a batch of thicker tortillas, or more quickly for a batch of thinner tortillas.

Figure 11A:
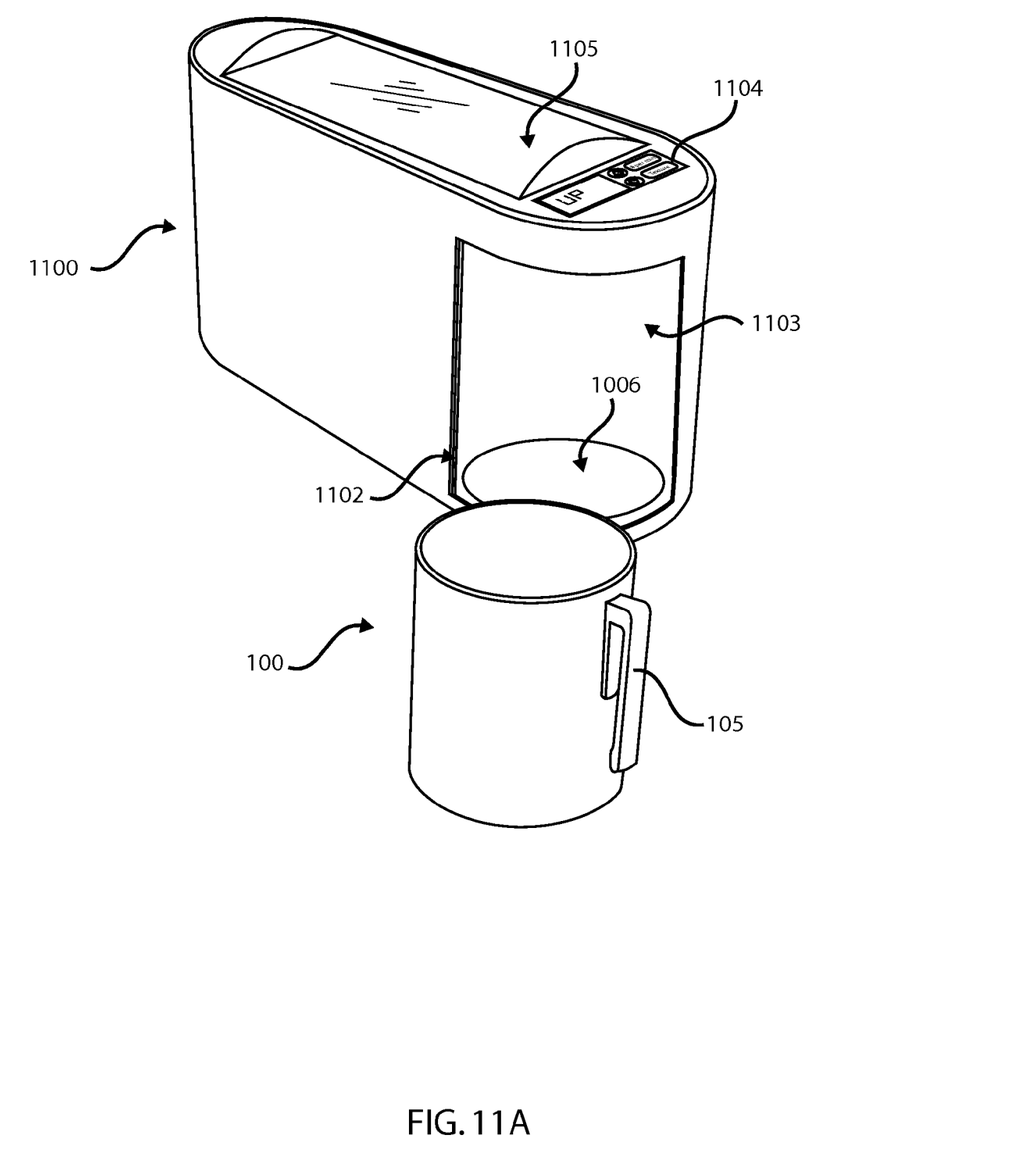
FIG. 11A is an illustration of an embodiment of the tortilla cartridge ready to be inserted into a housing of a tortilla warming system.

FIG. 11A is an illustration of a tortilla cartridge 100 ready to be inserted into a housing 1100 of a tortilla warming system. The tortilla warming system housing 1100 can have a door, such as a sliding door 1102, which can open to enable the cartridge 100 to be inserted into the appropriate space 1103 and positioned in the appropriate area 1006 within the housing. In this figure, the cartridge 100 is being inserted into the housing so as to feed tortillas into a warming system. Also shown in this figure are a viewer window 1105 for viewing the conveying of tortillas through the heating sub-system, and a control panel 1104 for controlling aspects of the conveying and/or heating of the tortillas, both being located at the top of the tortilla warmer housing 1100.

Figure 11B:
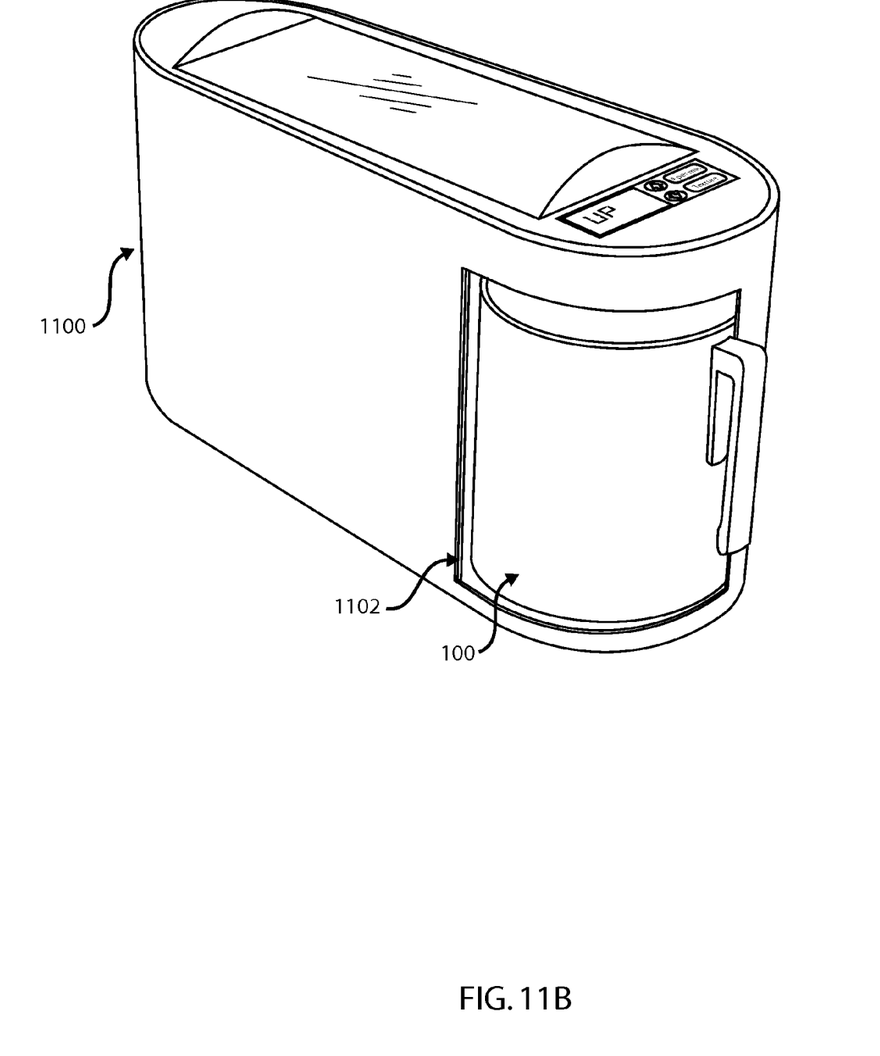
FIG. 11B is an illustration of the embodiment of FIG. 11A having been inserted into the housing.

FIG. 11B is an illustration of the tortilla cartridge 100 of FIG. 5A having been inserted into the housing 1100. In some embodiments, the cartridge 100 can be insulated, so as to preserve the tortillas inside the cartridge 100 at substantially room temperature. This can be important where the cartridge 100 is inserted into a location near the heating sub-system, which may cause the cartridge 100 to be exposed to high temperatures because of their proximity to the heating sub-system. This prevents tortillas which are not ultimately conveyed through the heating sub-system from being warmed up.

Figure 12:
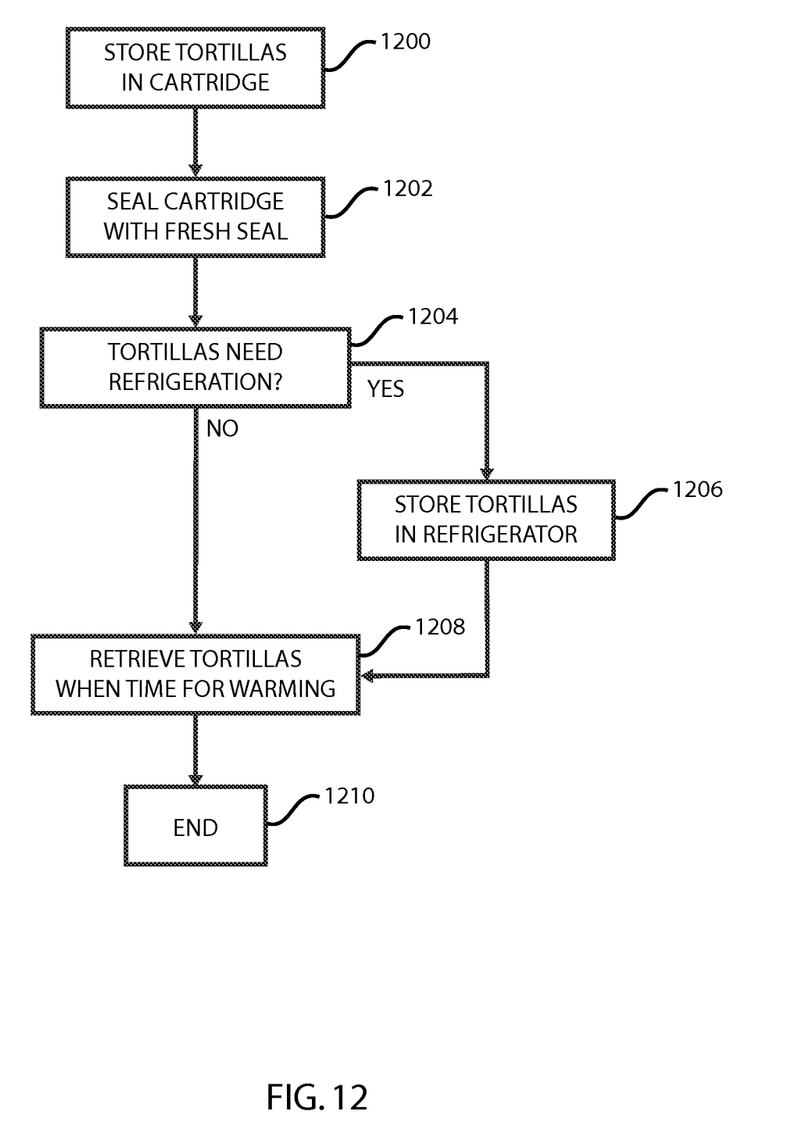
FIG. 12 is a flow chart showing the steps involved in using the tortilla cartridge to keep tortillas fresh when not being used in a tortilla warmer.

FIG. 12 is a flow chart showing the steps of the involvement of a tortilla cartridge in keeping tortillas fresh when not being used for heating of tortillas. Tortillas are stored in the tortilla cartridge when not in use 1200, and the cartridge is sealed with the fresh seal 1202. The tortillas are stored in a location for optimal freshness, such as a temperature-controlled location. If the tortillas require refrigeration 1204, for example if the tortillas will not be used again for several days and yet it is desired that they stay as fresh as possible, they are stored in a refrigerator 1206. When the time comes for the tortillas to be warmed, the cartridge can be retrieved and inserted into a tortilla warmer feeding system 1208.

Figure 13:
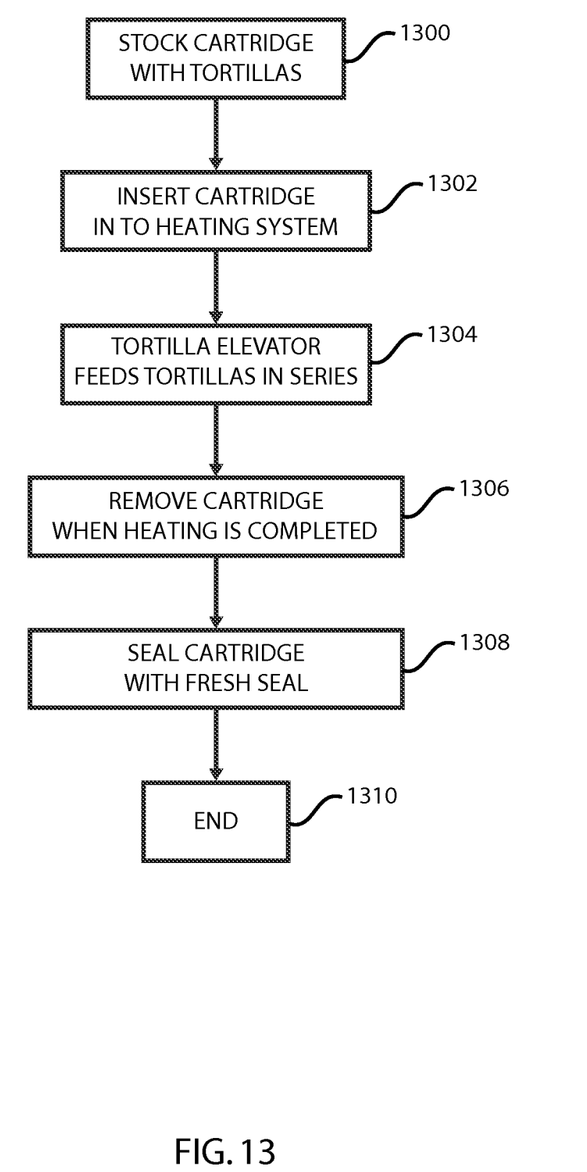
FIG. 13 is a flow chart showing the steps involved in using the tortilla cartridge in a tortilla warmer.

FIG. 13 is a flow chart showing the steps of the involvement of a tortilla cartridge in the heating of tortillas in a tortilla warmer. First, the cartridge is filled with tortillas sufficient to feed all who will be eating tortillas 1300. The cartridge is inserted into the tortilla warmer housing 1302, to be used to feed the tortillas in series into the heating sub-system 1304. In some embodiments, the top side of the top tortilla is frictionally engaged with a dragger which drags the top tortilla from the cartridge, and thereupon feeding the top tortilla into a warming system to be warmed to the desired temperature for consumption.

The cartridge is removed from the tortilla warmer when the heating of the desired quantity of tortillas has been completed 1306. Finally, the cartridge is sealed with its fresh seal 1308, and is then ready to be stored so as to keep the tortillas at optimal freshness.

Other modifications and implementations will occur to those skilled in the art without departing from the spirit and the scope of the invention as claimed. Accordingly, the above description is not intended to limit the invention except as indicated in the following claims.

What is claimed is:

1. A tortilla cartridge for storing and facilitating the feeding of tortillas into a heating sub-system of a tortilla warmer, the tortilla cartridge comprising:
    a container having an open top, the container configured to hold a stack of tortillas, the stack having a top tortilla residing in a top position located just above the open top of the container, the top tortilla thereby being accessible to the heating subsystem, the container comprising:
        a self-leveling motor-driven elevator assembly configured to automatically raise the stack of tortillas after each time that the top tortilla is removed from the top position of the stack, so that a next tortilla in the stack is thereby elevated into the top position to become the top tortilla, the elevator assembly further comprising at least one gear in communication with a toothed column and a worm drive, the worm drive being coupled to the motor;
    a lid for covering the open top of the container when the container is not being used to feed tortillas from the stack into the heating sub-system; and
    a fresh sealing mechanism for sealing the lid closed against the container with an airtight seal.

2. The tortilla cartridge of claim 1, wherein the self-leveling mechanism is configured to receive commands from a control unit.

3. The tortilla cartridge of claim 2, wherein at least one of the received commands controls the motor coupled to the worm drive.

4. The tortilla cartridge of claim 2 wherein at least one of the received commands is generated by a sensor that determines whether the top tortilla has been elevated to the top position.

5. The tortilla cartridge of claim 4, wherein the received command generated by the sensor is used to control the motor to adjust the height of the stack of tortillas to ensure that the top tortilla is always in the top position so that it can be fed into the subsystem.

6. The tortilla cartridge of claim 3, wherein:
    at least one of the received commands controls the motor to match a rate at which tortillas are removed from the stack and fed to the heating subsystem with a rate at which the tortillas are conveyed through the heating sub-system; and
    the at least one of the received commands that controls the motor is at least partly generated from a user control input associated with the tortilla warmer that controls the rate.

* * * * *